Patented Dec. 23, 1941

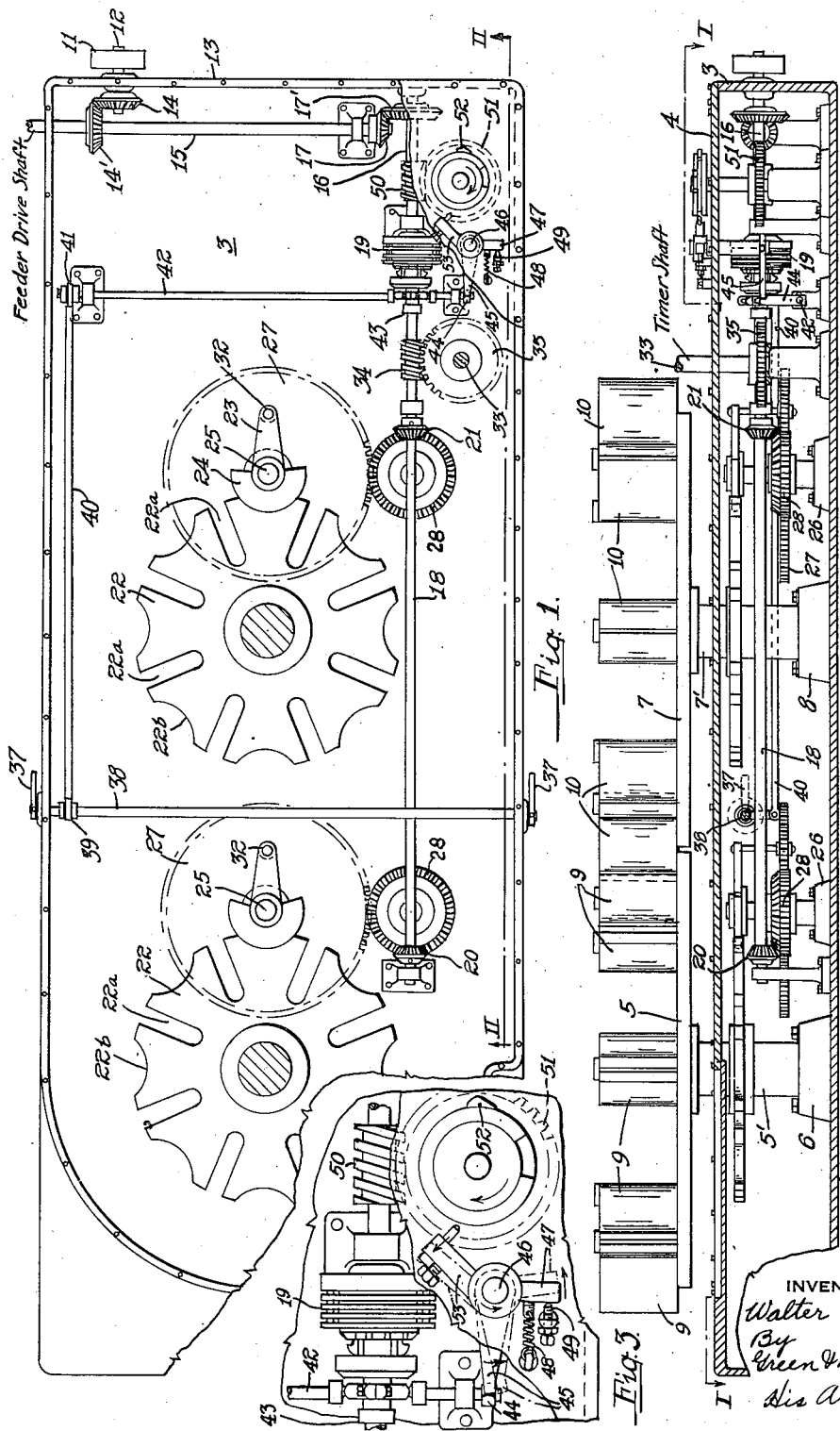

2,266,838

UNITED STATES PATENT OFFICE 2,266,838

DRIVE FOR GLASS FORMING MACHINES

Walter Winn, Brockway, Pa.

Application February 28, 1938, Serial No. 193,109

4 Claims. (Cl. 74—389)

This invention relates to glass forming machines of the stop and go type having two cooperating tables, and particularly to driving mechanisms for such machines.

It has long been customary to provide glass forming machines with two mold carrying tables so arranged that the molds of one table cooperate with those of the other in the formation of glass articles. It has also been customary to so drive the tables that each mold carried thereby is successively moved to predetermined positions of rest or stations at which the molten or plastic glass located within the mold cavity is subjected to some procedural operation in the course of converting it into finished ware. In addition, a partially formed article (parison) is transferred from a mold on one table (blank mold table) to a mold on the other table (blow mold table) while each such mold occupies a position of rest at a station termed "the transfer station." It is, therefore, apparent that it is necessary to so move the tables that the molds are accurately positioned in the various rest positions or stations.

From the foregoing it is apparent that the driving mechanism for both tables must be such as will not only periodically advance the tables through predetermined arcs of travel but will so advance them that the molds thereon are accurately positioned at the rest stations. Heretofore it has been considered necessary to employ what has been termed indexing mechanisms for the purpose of accurately determining the radial position of each mold as the table comes to rest. Such indexing mechanism is usually associated with a table-braking mechanism and generally constitutes a lock which accurately positions the table through the major portion of each rest period.

An object of my invention is to provide a drive for a two table stop and go machine of such character as will avoid the necessity for separate indexing mechanisms and associated devices.

This and other objects, which will be made more apparent throughout the further description of my invention, is accomplished by means of apparatus embodying the features herein described and illustrated in the drawing accompanying and forming a part hereof.

In the drawing, Figure 1 is a somewhat diagrammatic top plan view of a machine base, shown with the cover portion thereof removed to disclose the driving mechanism of a two table machine; the supporting columns for the table are shown in section for convenience of illustration; and Figure 2 is a diagrammatic sectional view along the line II—II of Fig. 1, but disclosing, in side elevation, the mold carrying tables in place on the columns.

Figure 3 is a fragmental plan view on an enlarged scale of a portion of the drive mechanism illustrated in Figures 1 and 2.

The base plate 3 of the machine is diagrammatically shown as forming a part of an enclosure for the drive mechanism and for that reason is shown provided with a cover 4 (Fig. 2). Each mold carrying table is mounted on a vertical shaft or column which is journaled in suitable step bearings carried by the base 3. That is to say, the blank mold carrying table 5 is mounted on a vertical shaft 5' which is journaled in a step bearing 6 so formed as to provide an adequate bearing for the shaft and support the shaft in a vertical position, and the finishing mold table 7 is likewise supported on a vertical shaft 7' which is journaled in a similar step bearing 8. Blank molds are diagrammatically illustrated at 9 and the finishing molds at 10.

Glass forming machines are usually operatively associated with an automatic feeder so arranged that a charge of glass is delivered to each blank mold as it occupies a charge receiving position. It is convenient and customary to drive the feeder and the forming machine by the same driving means. In the drawing, I have diagrammatically illustrated the driving means as a pulley 11, which is mounted on a drive shaft 12 journaled in an end wall 13 shown formed as a unitary part of the plate 3. Shaft 12 is provided with a bevel gear 14, which meshes with a cooperating bevel gear 14' mounted on a shaft 15, which is shown broken away and is indicated as the feeder driving shaft. The shaft 15 is shown coupled to a sub-shaft 16 by means of the bevel gears 17—17', it being understood that both the shafts 15 and 16 are suitably journaled on the bed plate 3 or associated portions. The shaft 16 is shown aligned with a shaft 18 and a clutch 19, diagrammatically shown as of the inter-leaving disc type, is provided for operatively coupling the two shafts 16—18.

Each of the tables 5 and 7 is provided with a Geneva drive mechanism and each such mechanism is operatively coupled to the shaft 18 and driven from that shaft.

In the apparatus illustrated, each table is provided with eight molds, consequently the Geneva drive mechanism associated therewith is adapted to advance the table in eight successive movements through arcs of equal length, in making one revolution. It will, of course, be understood that each Geneva drive mechanism is designed to accomplish the desired movement of the associated table and that where more or less molds are carried by the tables the design of the cooperating drive will be correspondingly varied.

Geneva drive mechanisms are old and well known but, so far as I know, no one has heretofore been successful in employing such drives for both the tables of a two table glass forming machine. I am not fully informed as to the difficulties encountered in connection with prior attempts to so employ such drives, but I have provided a combination of elements which operates successfully and I have accomplished this by employing a common drive for the two Geneva drive mechanisms of sufficient rigidity to prevent torsional lag of one mechanism behind the other and I have also eliminated, so far as possible, all opportunity for lost motion and backlash—at least in the portion of the drive actuated by the common shaft. In the drawing, the shaft 18 constitutes this common shaft and it is provided with two driving gears 20 and 21, each of which is accurately located thereon and drives one of the two Geneva mechanisms heretofore mentioned.

Each such mechanism consists of a driven disc 22, which is provided with alternately arranged radial slots 22a and peripheral recesses 22b. Each such disc 22 is mounted on one of the columns 5' or 7' and each is associated with a driving member illustrated as including a driving arm 23 and an indexing cam 24. Each arm 23 and cam 24 is mounted on a vertical shaft 25 which is mounted in a suitable step bearing 26 and is provided with a driving gear 27. As shown in Fig. 2, each gear 27 meshes with a gear 28, which is a combination bevel and spur gear, the bevel portion thereof meshes with one or the other of the bevel gears 20 or 21 of the common drive shaft 18. Each arm 23 is provided with a roller 32 which is adapted to move into the slots 22a of a cooperating disc and impart motion to that disc as the arm rotates around the axis of the shaft 25.

It will be apparent that the slots 22a, the peripheral recesses 22b, the indexing cams 24, the arm 23 and its roller 32 are so associated and arranged that during the rotation of the shaft 25, the arm 23 and its roller 32 move into a radial slot 21 just as the indexing cam 24 moves out of engagement with a peripheral recess 22b and vice versa the indexing cam moves into contact with a peripheral recess 22b just as the arm and its roller moves out of driving engagement with one of the slots 22a. Thus it will be apparent that the two elements 23 and 24 of the driving portion of the Geneva mechanism operate to impart motion to the driven disc and also to lock that disc in position during the intervals of rest.

In order that the two tables 5 and 7 may function properly to effectively accomplish the necessary cooperation between their individual molds it is, of course, essential that the two Geneva drive mechanisms be accurately positioned and adjusted with relation to each other. I have found that the initial setting of the two drives is simplified where the axes of the two shafts 25 are located in the plane defined by the axes of the shafts 5' and 7'. With such a location of the parts it is then a more or less simple operation to adjust the positions of the parts so that the axes of the rollers 32 also lie in the plane defined by the axes of the shafts 5' and 7'. With the parts in the positions noted the gears 20 and 21 can be readily adjusted and positioned on their carrying shaft 18. This can be accomplished by placing each of the two gears in mesh with the cooperating gear of the train and then tentatively adjusting its position while employing a wrench or other tool to hold each gear (20—21) in a driving position such that all slack is taken up in the gear train associated with it. After this tentative positioning of the gears 20 and 21 is accomplished the shaft 18 may be placed under driving torque, but under conditions such that neither of the Geneva mechanisms is actually moved by it. This is merely for the purpose of assuring that the positioning of the gears 20 and 21 will accommodate such torsional yield as may be encountered in the shaft itself under operating conditions. After this preliminary adjustment the two tables may be operated, under loads approximating their normal loads, and accurate measurements can be made in connection with points on the periphery of each table for the purpose of assuring that the gears 20 and 21 are properly positioned on the shaft 18. These gears may then be permanently positioned on the shaft.

I also employ the shaft 18 to drive the timer shaft 33 for the forming machine. As illustrated, the shaft 18 is provided with a worm 34, which meshes with a worm wheel 35 carried by the timer shaft 33. The timer shaft actuates the various timing equipment of the forming machine and this equipment is not shown because it forms no part of the present invention.

When the clutch 19 is released the operation of the forming machine ceases but, as indicated, the shaft 15 continues to rotate and consequently continues to actuate the feeder. For the purpose of assuring that the forming machine, when again thrown into operation, will be in synchronism with the operations of the feeder, I have provided a lock out mechanism which controls the operation of the manual means illustrated for throwing the clutch 19 back into locking engagement.

The manual means for operating the clutch 19 includes handles 37—37 mounted on a shaft 38 rotatably associated with the plate 3. An arm 39 is carried by the shaft 38 and is so arranged that it reciprocates a rod 40, which in turn actuates a lever 41 carried by a shaft 42 rotatably mounted on the plate 3. The shaft 42 is also provided with a lever, which is adapted to shift the position of a collar 43 along the shaft 18 in response to the turning of the shaft 42. In this way the clutch 19 is either thrown into or out of operation, depending upon the rotation imparted to the shaft 42 by the movement of one or the other of the handles 37. The shaft 42 is provided with a keeper lever 44, adapted to be so engaged by a lock lever 45 as to prevent movement of the shaft 42 which will occasion a throwing in of the clutch 19.

As shown, the lever 45 is mounted on a vertical shaft 46 carried by the cover portion 4 (Fig. 3). This shaft is also provided with a spring restrained arm 47 so coupled to a coil spring 48 as to tend to normally hold the end of the lever 45 in such a position as to block the movement of the keeper lever 44 occasioned by a shifting of the parts such as to "throw in" the clutch 19.

A stop 49 is also provided for the arm 47 and is so located as to accommodate the aforementioned positioning of the arm 45.

From the foregoing it will be apparent that when the handle 37 is moved to release the clutch 19, the keeper lever 44 is turned counter-clockwise as shown in Fig. 2 and, therefore, permits the end of the lever 45 to snap inwardly—in response to the pull of the spring 48—to a position such as to block a clockwise movement of the arm 44. In order to permit the clutch 19 to be again engaged, and engaged at such a time as to provide the desired synchronous operation between feeder and forming machine, I have provided means for periodically shifting the end of the arm 45 out of the path of travel of the arm 44. As shown, this means includes a worm 50 mounted on the stub shaft 16 and actuating a worm wheel 51, which carries a cam lobe 52 adapted to periodically engage and move an arm 53, which is also rigidly mounted on the shaft 46 and so arranged that when engaged by the lobe 52 it will turn the shaft 46 in opposition to the pull of the spring 48 and thus move the arm 45 out of the path of travel of the arm 44. It will, of course, be apparent that the lobe 52 is accurately located on the worm wheel 51 and is so located that it accommodates such a throwing in of the clutch 19 as will re-establish the desired synchronous operation between machine and feeder.

While the apparatus illustrated as an embodiment of my invention is more or less diagrammatic, and while I have omitted all structural details not essential to the disclosure of my specific invention, it will be understood by those skilled in the art that various changes, additions, omissions and substitutions may be made in the apparatus illustrated without departing from the spirit and scope of my invention as set forth by the appended claims.

What I claim is:

1. A driving mechanism for apparatus such as a glass-forming machine having two rotatable tables and an associated glass feeder, comprising two Geneva drives, each operatively coupled to one of the tables of such machine, a single drive shaft for both drives, substantially identical operative connections between said shaft and each of said drives, a source of power, a disconnectible clutch between said shaft and said source, a feeder actuating shaft operatively coupled to said source of power and intervening between said source and said clutch, a timer shaft operatively coupled to said drive shaft, means for engaging and disengaging said clutch, and a periodically actuated keeper rendered effective by a disengaging movement of said means, for controlling the clutch-engaging movement of said means.

2. A drive mechanism for two rotatable tables, such as the mold-carrying tables of a two-table glass-forming machine, comprising a source of power, a feeder drive operatively coupled to said source, two Geneva drives, a single drive shaft operatively coupled to both such drives, a clutch mechanism between said drive shaft and said source, manual means for actuating such clutch mechanism to operatively connect such single shaft to and disconnect it from said source of power, and means operating in synchronism with said feeder drive for periodically blocking a clutch actuated movement of said manual means.

3. A drive mechanism for apparatus such as a glass-forming machine comprising a rotatable table, a drive shaft means for operatively coupling said shaft to said table, a power source, a clutch mechanism for operatively coupling said shaft to said source, means for engaging and disengaging said clutch, a keeper, rendered effective by a clutch-disengaging movement of said means for preventing a clutch-engaging movement of said means, and power-actuated means for periodically rendering said keeper ineffective.

4. A drive mechanism for apparatus such as a glass-forming machine, comprising a rotatable table, a drive shaft means for operatively coupling said shaft to said table, a timer shaft actuated by said drive shaft, a power source, a clutch mechanism between said drive shaft and said power source, means for engaging and disengaging said clutch, and a keeper, rendered effective by a disengaging movement of said manual means, and means actuated by said power source for periodically rendering said keeper ineffective.

WALTER WINN.